US005138667A

United States Patent [19]

Roch et al.

[11] Patent Number: 5,138,667

[45] Date of Patent: Aug. 11, 1992

[54] PROCESS AND DEVICE FOR DETECTING PRINT REGISTRATION MARKS ON A WEB FROM A MULTI-COLOR PRINTING PRESS

[75] Inventors: Roger H. Roch, Cossonay-Ville; Vaclav Vitous, Bussigny; Panayotis Kammenos, Bursins, all of Switzerland

[73] Assignee: Bobst SA, Lausanne, Switzerland

[21] Appl. No.: 535,031

[22] Filed: Jun. 8, 1990

[30] Foreign Application Priority Data

Jun. 8, 1989 [CH] Switzerland ........................ 02181/89

[51] Int. Cl.[5] ............................................... G06K 9/00

[52] U.S. Cl. .......................................... 382/1; 382/61; 101/181; 250/548; 250/557

[58] Field of Search ................ 250/548, 557; 356/400, 356/401; 382/1, 61; 101/181, DIG. 46

[56] References Cited

U.S. PATENT DOCUMENTS

| | | | |
|---|---|---|---|
| 4,484,079 | 11/1984 | Betz et al. | 250/548 |
| 4,528,630 | 7/1985 | Sargent | 250/548 |
| 4,600,841 | 7/1986 | Tokuno et al. | 250/557 |
| 4,719,575 | 1/1988 | Gnuechtel | 250/548 |
| 4,901,359 | 2/1990 | Bruder | 382/61 |
| 4,926,048 | 5/1990 | Lerner et al. | 250/548 |
| 4,932,320 | 6/1990 | Brunetti et al. | 101/181 |

FOREIGN PATENT DOCUMENTS

| | | |
|---|---|---|
| 0127831 | 12/1984 | European Pat. Off. . |
| 0221472 | 5/1987 | European Pat. Off. . |
| 89/01867 | 3/1989 | World Int. Prop. O. . |

*Primary Examiner*—Michael Razavi

*Attorney, Agent, or Firm*—Hill, Van Santen, Steadman & Simpson

[57] ABSTRACT

A process consists of detecting a printed registration mark composed of recognition signals and of a color pilot mark, comparing the image of the signs of the printed registration mark to the signs of a virtual reference registration mark, then defining a basic area for each sign, calculating a geometric center of every basic area, detecting any color pilot mark in these basic areas, calculating and memorizing the geometric center for the detected pilot mark, measuring an offset position between the geometric center of the basic area and the geometric center of the detected color pilot mark and utiliziing the measured offset position for controlling a misregistration correction appliance of a printing press. The device for accomplishing the process includes an arrangement for performing each of the above-mentioned steps.

7 Claims, 6 Drawing Sheets

PROCESS AND DEVICE FOR DETECTING PRINT REGISTRATION MARKS ON A WEB FROM A MULTI-COLOR PRINTING PRESS

BACKGROUND OF THE INVENTION

The present invention is directed to a process and device for detecting print registration marks on a multi-color printing press processing sheet or web-shaped matter having an area for printing an image and an area for the printing of accuracy control signs or marks.

The problems, which are involved with the registration color prints of various units of a multi-color print press, especially for varying printing units of an offset press, are well known to the designer of such machines. These designers have already investigated into ways of detecting and correcting misregistration in order to avoid, as reliably as possible, the print deficiency caused by misregistration of the various color prints.

One of the solutions adopted consists in printing one or several registration marks as a reference for the image printed and these marks are situated within a printless area of the sheet or web-like matter to be processed by the printing machine. For instance, these marks are placed on the margin of the sheet or web or else, in certain cases, within a space situated between two successive prints. These registration marks, which are used for checking both lengthwise and crosswise misregistration, usually have a trapezoidal shape and their detection is achieved by a scanning device. Checking the position of a registration mark printed by a printing unit with reference to the position of a registration mark printed by another printing unit, therefore, requires, in the first place, the opening of a scanning window in the area foreseen for the arrangement of the registration mark. This requires a determination of the position of such a scanning window and the recognition therein of an image which will actually be the registration mark. The subsequent operation consists in measuring the mark dimensions within an area identical to all subsequent marks appearing under the scanning device so that the existing misregistration can be obtained. At the next stage, the measuring data is converted into corrective signals, which are used by a registration correction appliance. With this solution, the registration marks have a relatively large size enabling proper scanning. A device which allows the obtaining of a scanning window is described in detail by Swiss Patent No. 548,933. A device for scanning and recognition of register marks is covered and described in Swiss Patent No. 556,738.

As already mentioned, this way requires large size marks to insure acceptable detection of crosswise and lengthwise print misregistration. However, the acceptance of large size marks will inevitably lead to a heavy loss of material. In fact, on account of the present printing technology, registration marks are required to be situated in a printless area which is rather large to enable reliable distinction from the printed motif. Furthermore, the area for printing registration marks is not to subsist on the final product, for which reason it is to be eliminated as a mere piece of waste.

SUMMARY OF THE INVENTION

The present invention is directed to providing a solution to the problem of waste involved with the use of registration marks for correcting lengthwise and crosswise print misregistration and which considerably enhances the reliability for scanning of the marks.

For this purpose, the invention is directed to a process for detecting print registration marks on a multi-color printing press processing web or sheets with the area for printing the image and another area for printing the marks to allow a check of the print accuracy, said process comprising the successive steps of comparing a printed registration mark with at least two recognition sign and a color pilot mark with a virtual reference registration mark of a similar configuration, which reference mark only includes the recognition sign; determining at least a basic area for scanning the color pilot mark for each recognition sign; calculating and memorizing a geometric center of every basic area for scanning the color pilot mark; successively detecting the color pilot mark within every basic area; calculating and memorizing the geometric center of every detected color pilot mark; measuring along both the ordinate and abscissa axes the offset position between the geometric center of the basic area and the geometric center of the color pilot mark; converting the measurements taken for the offset position into control signals to be used for controlling a print misregistration correction apparatus.

The device or apparatus for executing a process according to the method comprises means for illuminating and scanning the printed registration marks; means for generating and memorizing a virtual reference registration mark; means for comparing, which enables the recognition between the printed registration mark and the reference registration mark; means for determining, within the limits of the means for comparing, at least one basic area for scanning a color pilot mark; means for calculating and memorizing a geometric center of every basic area; means for detecting, in every basic area, the color pilot mark; means for calculating and memorizing the geometric center of the color pilot mark which is detected; means for measuring both along an abscissa and ordinate axes the offset position between the geometric center of the basic area and the geometric center of the color pilot mark detected in the area; means for enlarging said basic area and means for converting the offset position measurements gathered between the geometric center of the basic area and the geometric center of the color pilot mark into control signals to be used for acting on a misregistration correction device.

Other advantages and features of the invention will be readily apparent from the following description of the preferred embodiments, the drawings and claims.

DESCRIPTION OF THE PREFERRED EMBODIMENTS

Figure 4:
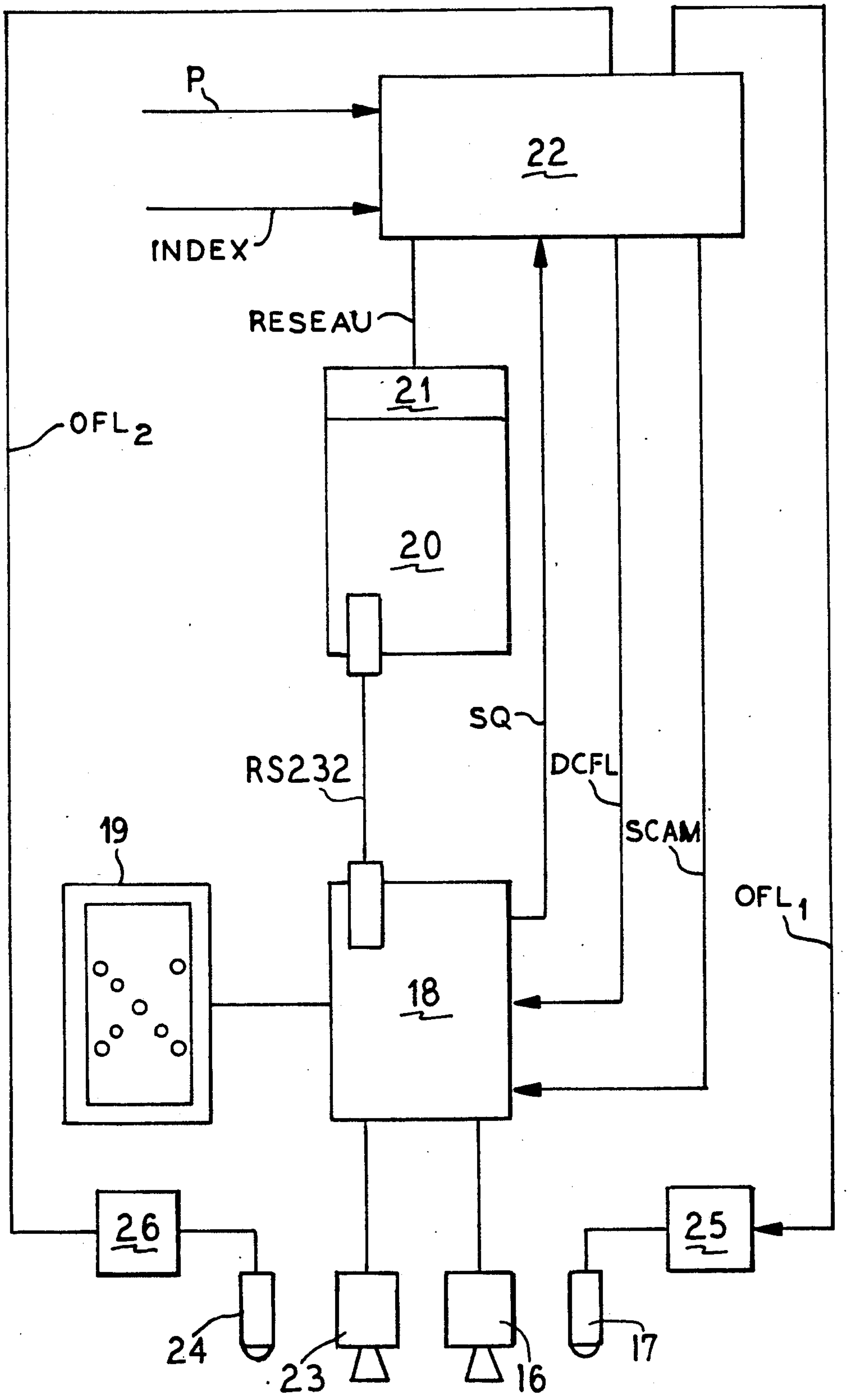
FIG. 4 is a schematic view of an apparatus to be used for detecting a registration mark.
Figure 6:
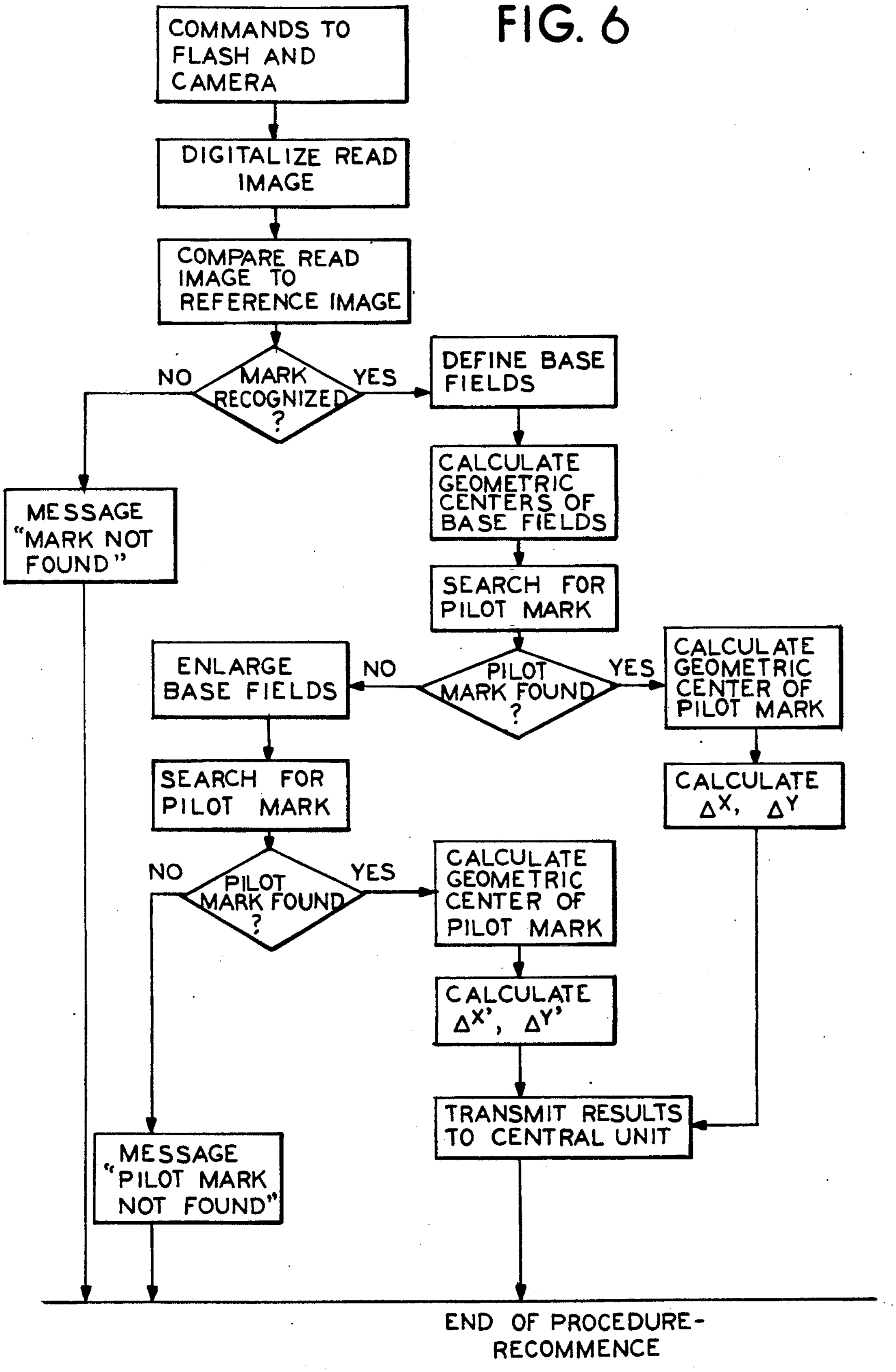
FIG. 6 is a flow diagram of an operation for the device of FIG. 4.

The principles of the present invention are particularly useful in a device which is schematically illustrated in FIG. 4 for performing a process or method, as illustrated by the flow chart of FIG. 6.

Figure 1:
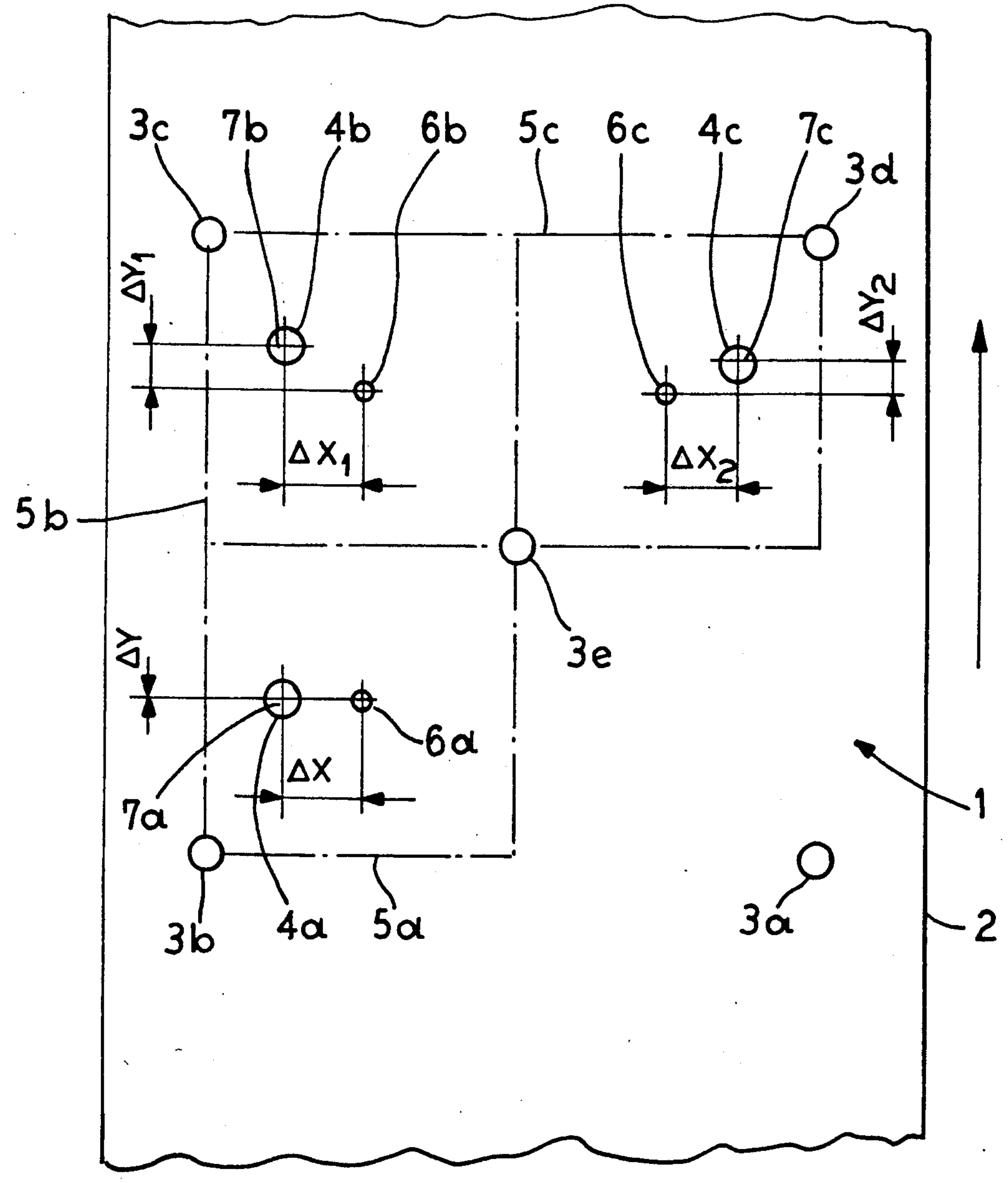
FIG. 1 is a plan view of a first registration mark.

FIG. 1 features a first registration mark 1, which is printed on a web-like material 2, such as cardboard. This registration mark is printed in an area which is reserved for print accuracy control signs, for instance an area situated between two motifs being printed on the web 2 or else into an area situated laterally on the web relative to the area in which the motifs are printed. Since the registration marks 1, which form the print accuracy control signs, are always situated on the web in an area which is to be discarded, the purpose of the present invention is to reduce the area required for these accuracy control signs so that the surface usable for the printed motif can be increased.

The print registration marks 1, according to FIG. 1, consist of five recognition signs 3*a*–3*e*. These signs 3*a*–3*e* are represented here as commencement of staggered points arranged in the way of five points presented on a face of a dice or, in other words, have the signs 3*a*, 3*b*, 3*c* and 3*d* representing the corners of a square and the fifth sign 3*e* being at the center of the square.

The print registration mark 1 has also three color pilot marks 4*a*, 4*b* and 4*c*. The mark 4*a* is the one corresponding to a printing unit applying the blue color, the mark 4*b* is the one corresponding to a printing unit applying the red color, and the mark 4*c* is the one corresponding to the printing unit applying the yellow color. The printing unit applying the black color is, in this case, the first printing unit and will be the basic unit, and its color pilot mark is represented by the five recognition signals 3*a*–3*e* of the print register mark 1. It is well understood, however, that the sequence of the various colors can be different.

FIG. 1 shows, in dot-dash lines, basic areas 5*a*–5*c*, which are attributed to each of the color pilot marks 4*a*–4*c*. Since the basic areas 5*a*–5*c* are shown with almost a square shape, it is possible to determine a geometric center 6*a*–6*c* for each of them. Moreover, it is possible to determine the geometric center 7*a*–7*c* of all color pilot marks 4*a*–4*c*. On the basis of this arrangement, it will, thus, be possible to evaluate, along the abscissa and ordinate axes, the positional error or offset error of every one of the color pilot marks 4*a*–4*c* with regard to the geometric centers 6*a*–6*c* of every one of the basic areas 5*a*–5*c*. These positional or offset errors will take on the value $\Delta X$, $\Delta X_1$ and $\Delta X_2$ along the abscissa axis and the values of $\Delta Y$, $\Delta Y_1$ and $\Delta Y_2$ along the ordinate axis.

Figure 2:
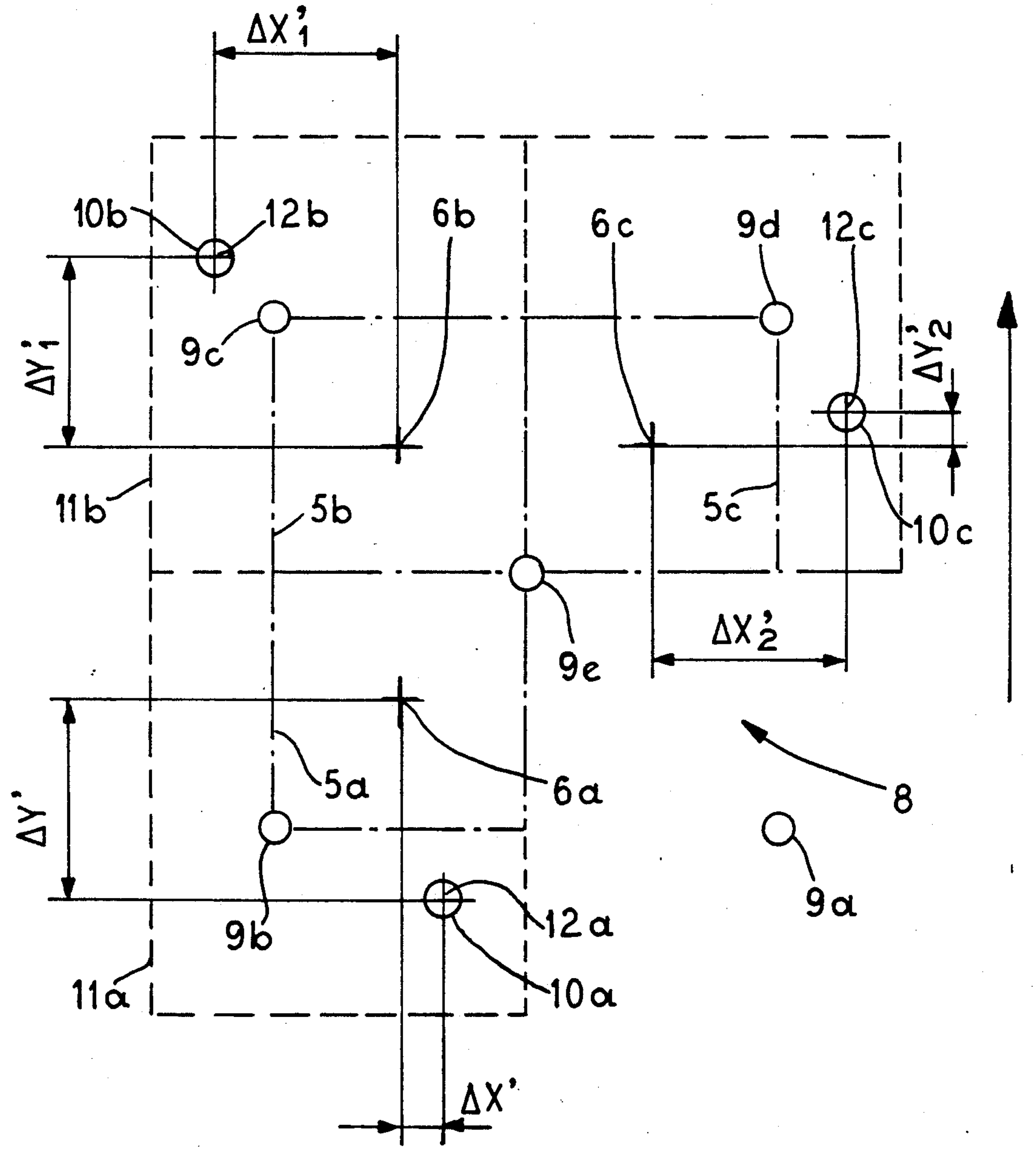
FIG. 2 is a plan view of a second registration mark.

FIG. 2 represents a second registration mark 8, which is fully identical to the registration mark 1 of FIG. 1 regarding the arrangement of signs 9*a*–9*e*. The second registration mark differs from the first one by the positions taken by the color pilot marks 10*a*–10*c*, which are arranged, in the present case, outside of the five signs 9*a*–9*e*, making up the mark 8. This arrangement of color pilot marks 10*a*–10*c* appears, for instance, when the machine starts up, which arrangement can be assimilated to a transitory period during which the misregistration is likely to be larger than with ordinary cruising or printing speeds. Nonetheless, there must be ) a capacity to detect these positional errors of the color pilot marks 10*a*–10*c* so that the device can be passed from a transitory start-up condition to the operating or cruising speed. To this aim, the basic areas 5*a*–5*c*, according to FIG. 1, are enlarged into enlarged areas 11*a*–11*c*. Another definition will be necessary for the positioning of the geometric centers 12*a*–12*c* of every one of the color pilot marks 10*a*–10*c*. It will then be possible to calculate along the abscissa and ordinate axes, the positional errors of each color pilot mark 10*a* to 10*c* with regard to the geometric centers 6*a*–6*c* of all basic areas 5*a*–5*c*. These positional errors will take on the values of $\Delta X'$, $\Delta X'_1$, $\Delta X'_2$ along the abscissa axis and $\Delta Y'$, $\Delta Y'_1$, $\Delta Y'_2$ along the ordinate axis.

Figure 3:
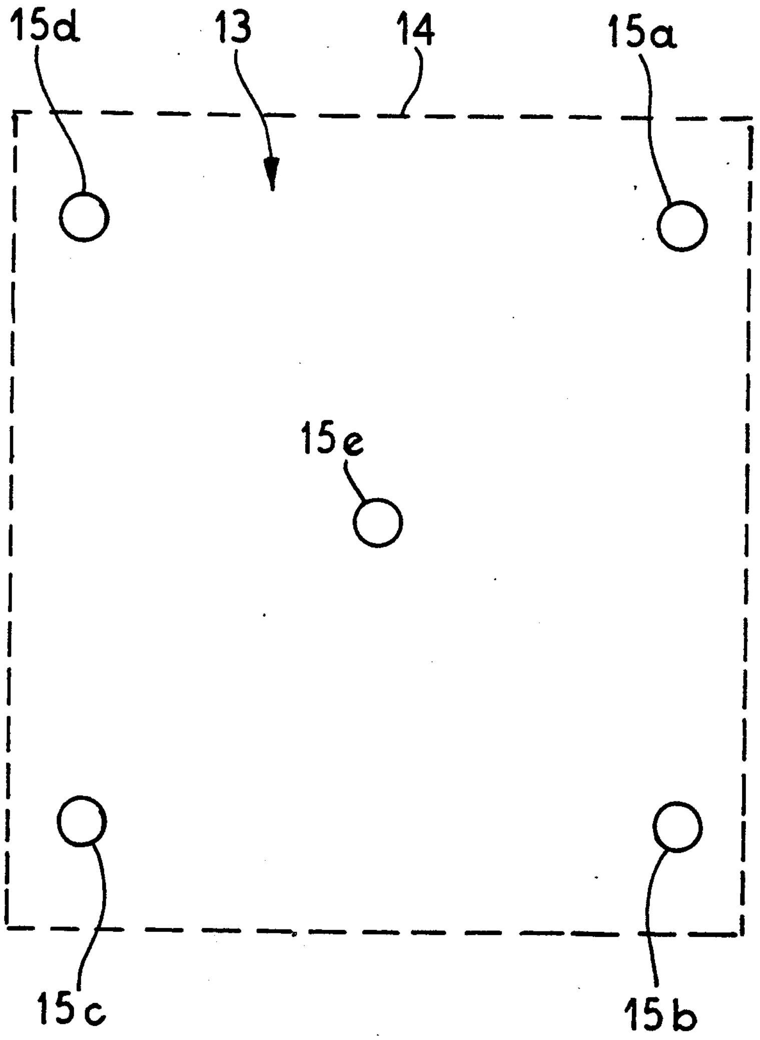
FIG. 3 is a plan view of an image of a virtual reference registration mark.

FIG. 3 represents the image of a virtual reference registration mark 13 which has been positioned within a square of dash lines 14 for a better understanding. This virtual reference registration 13 comprises the same number of signs 15*a*–15*e* as the print registration mark 1 or 8. The arrangement of these signs 15*a*–15*e* within the virtual reference registration mark 13 is identical to the one for the printed registration mark 1 or 8. It might, though, happen that there will be a positional difference between the signs of the virtual reference registration mark 13 and the signs of the print registration marks 1 or 8. In this case, as will be seen further on, an adaptation of the image comparator will be done in such a way as to absorb an admissible deficiency of coincidence between the various signs.

A print registration detector according to the present invention is illustrated schematically in FIG. 4 and it is designed for scanning either a front edge or back edge of a printing motif or field on the printed web. To this aim, the detectors comprise a first high-speed camera 16 with a very low optical aberration operating jointly with a first flash projector 17 for a front edge and a second camera 23 operating jointly with a second flash projector 24 for the back edge. The cameras 16 and 23 are linked to an image processor 18 equipped with an image visualizing monitor 19. The image processor is linked to a central unit 20 consisting of a type PC-AT personal computer or a similar appropriately chosen computer. The central unit 20 includes an interface 21 for processing data concerning the machine operating conditions which are, themselves, recorded by a machine data conditioner 22. This conditioner 22 is fed by the machine with INDEX data originating from a pulse generator fitted on the printing cylinder of the machine. The INDEX data corresponds to a zero rate of the pulse generator and is used for calculating by the means of a pulse counter, the number of pulses separating the INDEX position from the printing plate image on the printing cylinder. The pulse generator and the counter are conventional and are not represented in the present Figure.

The conditioner 22 also receives data P signalling the moment at which the flash projectors 17 and 24, respectively, are to be actuated. These data originate from a pulse generator coupled with a counter (not illustrated) and will be defined proportionally to the rate emitted by the INDEX data. The conditioner 22 will, in turn, emit, simultaneously and consecutively, a selected signal SCAM for the camera, a signal DCFL for calling forth for the flash projector, and will receive, under acceptable conditions, an acknowledgment signal SQ. When the conditioner has accepted the acknowledgment signal SQ, it will then emit a flash projector command $OFL_1$ or the flash projector command $OFL_2$, depending on whether the camera 16 or 23 is selected. The signal $OFL_1$ will be transmitted to a first control circuit 25 for the first flash projector 17 and the signal $OFL_{12}$ will be transmitted to a second control circuit 26 for the second flash projector 24. The connection between the image processor 18 and the central unit 20 is achieved by means of a wire RS232, wherein the central unit 20 is linked to the conditioner by means of a network RESEAU.

Figure 5:
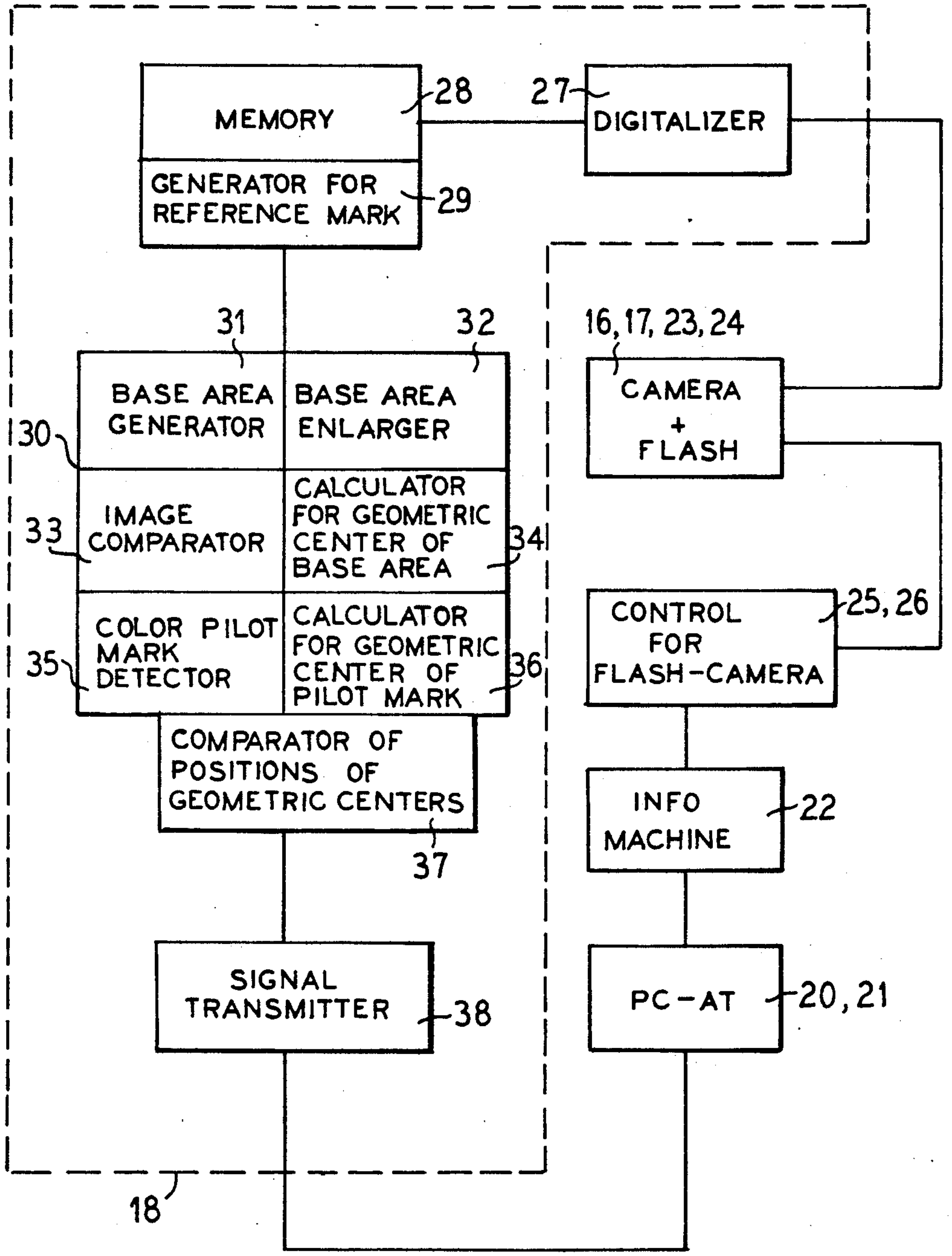
FIG. 5 is a block diagram of the device of FIG. 4.

A block diagram of the device of FIG. 4 is illustrated in FIG. 5 and represents a detailed view of the components in which the registration mark detector consists. This Figure also shows, for easy understanding, the means for scanning the registration mark, i.e., the cameras 16 and 23, their flash projectors 17 and 24, as well as the control circuits 25 and 26. The central unit 20 and its interface 21 and the conditioner 22 are also represented.

The image processor 18 is represented in dashed lines and includes a digitalizer 27 which is linked to a memory 28, which is connected to a circuit generator 29 for creating the virtual reference registration mark 13. The image processor 18 also has a discrimination unit 30 composed of a basic area generator 31, a basic area enlarger 32, an image comparator 33, a computer 34 for calculating the geometric center of the basic area, a color pilot mark detector 35, a computer 36 for calculating the geometric center of the detected color pilot mark and a comparator 37 for comparing the position of the geometric centers allowing for the recognition of positional errors between the geometric center of the basic area and the geometric center of the color pilot mark. The discrimination unit 30 is followed by a signal transmitter 38, which acts as an outlet stage.

The device or apparatus of FIG. 4 will operate in the following manner, which is illustrated by a flow chart of FIG. 6. This operation takes place as follows:

In a first stage, the printed registration mark is to be read. To this aim, commands are to be emitted to a flash projector and camera by means of a signal originating from the conditioner 22, as illustrated in FIG. 5. The image, thus, read will then be digitalized and, on the basis of this digitalization, an investigation will be launched with a view to establish that a registration mark is actually being dealt with and to which purpose the digitalized image is compared to the virtual reference registration mark. For all signs composing the virtual reference registration mark, a scanning reliability mark will be provided so as to cause a certain amount of distortion between the read image and the reference image. In this way and with reference to FIGS. 1 and 3, it will be sufficient so as to establish that the mark is actually a registration mark and that the recognition signs 3*a*–3*e* of the printed registration mark 1 correspond to the signs 15*a*–15*e* of the virtual reference registration mark 13. With this correspondence established, it may be admitted that the reference mark has been spotted or detected.

Thus, a reference mark has been recognized and the next appropriate step is to define the basic areas 5*a*–5*c* for scanning in order to retrieve, if any, a color pilot mark 4*a*–4*c*. With the basic areas 5*a*–5*c* defined, a calculation will determine the position of the geometric centers 6*a*–6*c*, which positions will be memorized. Thereupon an investigation or scan will be undertaken in order to retrieve, in every basic area 5*a*–5*c*, a possible existing color pilot mark 4*a*, 4*b* or 4*c*. Then, with the color pilot mark 4*a*, 4*b* or 4*c* being retrieved, the geometric center 7*a*, 7*b* or 7*c* will have to be defined. Finally, a calculation will determine the offset position $\Delta X\text{-}\Delta X_2$ and $\Delta Y\text{-}\Delta Y_2$, whereupon the results of these measurements will be transmitted to the control unit 20, which will actuate a misregistration correction device of the printing press, which correction device is conventional.

In the case of transitory speeds, i.e., when the printing presses are being started up, it will be appropriate to enlarge the basic area 5*a*–5*c* in order to be able to detect the color pilot mark situated out of the area of the basic area 5*a*–5*c*. Thus, with the registration mark retrieved and recognized as corrected, the basic areas 5*a*–5*c* defined and their geometric centers 6*a*–6*c* calculated, the system having emitted a statement, such as "color pilot mark not retrieved", it will be necessary to enlarge the basic area 5*a*–5*c* so as to transform them into enlarged areas 11*a*–11*c* for scanning (see FIG. 2). An investigation or search is carried out within the enlarged areas 11*a*–11*c* to determine the existence of a color pilot mark 10*a*–10*c*. With these marks being scanned or detected, their geometric centers 12*a*–12*c* will then be determined, whereupon a calculation will determine the offset position $\Delta X'\text{-}\Delta X'_2$ and $\Delta Y'\text{-}\Delta Y'_2$ of the geometric centers 12*a*–12*c* of the color pilot marks 10*a*–10*c* with regard to the geometric centers 6*a*–6*c* of the basic areas 5*a*–5*c*. In the next step, these results are transmitted to the central unit 20, the task of which is to control the misregistration correction appliance of the printing press. The permanent or cruising speed will then be automatically reached when the color pilot marks are detected in an area which is defined by the basic areas 5*a*–5*c*.

In cases where the print registration mark 1 cannot be compared with the virtual reference registration mark 13, the system will emit a "mark not found" message, which will announce the end of the process, which will then have to be started over again.

In the case where, even after the enlargement of the basic area 5*a*–5*c*, no color pilot mark is spotted, the system will emit a "pilot mark not found" message. This message announces the end of the process, which will then need to be started again.

In the present description, the scanning of the print register marks has been achieved by means of a high-speed camera with a very small optical aberration, since the print register marks are still visible to the naked eye. It would, however, also be imaginable to use cameras of an even better performance allowing the scanning of print registration marks which are invisible to the naked eye.

Although various minor modifications may be suggested by those versed in the art, it should be understood that we wish to embody within the scope of the patent granted hereon all such modifications as reasonably and properly come within the scope of our contribution to the art.

We claim:

1. A process for detecting print registration marks on a web of a multi-color printing press, which webs have areas for printing images and other areas for printing the marks to allow the checking of the print accuracy, the process comprising the following successive steps of: comparing a print registration mark comprising of at least one color pilot mark with two recognition signs associated with each color pilot mark with a virtual reference registration mark of a similar configuration, but including only the recognition signs; determining at least a basic area for scanning each of the color pilot marks by utilizing the two recognition signs associated therewith; calculating and memorizing the geometric center of every basic area for scanning the color pilot marks; successively detecting the color pilot marks within every basic area; calculating and memorizing the geometric center of every detected color pilot mark;

measuring along both the ordinate and abscissa axes an offset position between the geometric center of the basic area and the geometric center of the detected color pilot mark; and converting the measurements taken from the offset positions into control values to be used for controlling a print misregistration correction appliance.

2. A process according to claim 1, wherein the step of comparing the printed registration marks includes memorizing the signs of the virtual reference registration mark and comparing the printed registration mark's recognition signs to the memorized signs.

3. A process according to claim 2, which includes the registration marks being invisible to the naked eye and said step of comparing has the registration marks invisible to the naked eye compared to the virtual reference registration mark previously memorized.

4. A process according to claim 1, which includes, after determining a basic area for scanning the color pilot marks, enlarging the basic area to an enlarged basic area, which includes the first-mentioned basic area, to increase a viewing area for determining the location of the color pilot marks.

5. A device for locating printed registration marks and color pilot marks and comparing these to a fixed registration mark to determine misregistration, said device comprising means for illuminating and scanning a printed registration mark comprising at least one color pilot mark with two recognition signs for each color pilot mark; means for generating and memorizing of virtual reference registration mark; means for comparing the printed registration mark to the virtual reference mark; means for determining within the limits of the means for comparing at least one basic area for each color pilot mark by utilizing the two recognition signs for scanning the color pilot mark; means for calculating and memorizing the geometric center of every basic area; means for calculating and memorizing the geometric center of every basic area; means for calculating and memorizing the geometric center of every basic area; means for detecting, in every basic area, the color pilot mark; means for calculating and memorizing the geometric center of the detected color pilot mark; means for measuring both along the abscissa axis and the ordinate axis an offset position between the geometric center of the basic area and the geometric center of the detected pilot mark in the basic area; means for enlarging said basic area; and means for converting the offset position measurement gathered between the geometric center of the basic area and the geometric center of the detected color mark into control signals for use for acting on a misregistration correction appliance.

6. A device according to claim 5, wherein said means for illumination and scanning of the registration mark consist of a flash projector operating jointly with a small aberration, high speed camera.

7. A device according to claim 5, wherein the means for generating and memorizing a virtual reference registration mark, the means for comparing the registration marks with the virtual reference registration marks, the means for determining, within said means for comparison, a basic area for scanning a color pilot mark, and the means for enlarging said basic area all consist of an image processor comprising a digitalizer acting jointly with a memory and including a generator for generating virtual reference registration marks connected to an image comparator receiving the images of the digitalized printed marks and the image of the virtual reference registration marks, and emitting a signal of similarity of the compared images, which signal in case a similarity is transmitted to a generator for the basic area connected to a calculator for the geometric center of said basic area and memorizing the data concerning the position of said geometric center, said generator for the basic area being coupled, on the one hand, to a detector of the color pilot marks which emits signals indicating the presence of the color pilot mark within the basic area and is coupled, on the other hand, to an enlarger for the basic area, said detector for the color pilot mark being connected to a position comparator for the geometric center of the basic area and for the geometric center of the color pilot mark, said position comparator transmitting the offset positions appearing between the geometric center for the detected pilot mark and the basic areas to a signal transmitter connected to a central unit controlling a misregistration correction unit through a conditioner.

* * * * *